Oct. 11, 1966     E. S. JOLINE     3,277,695

VIBRATION ANALYZER

Filed June 22, 1961     3 Sheets-Sheet 1

INVENTOR.
EVERETT S. JOLINE
BY
ATTORNEY

Oct. 11, 1966     E. S. JOLINE     3,277,695

VIBRATION ANALYZER

Filed June 22, 1961     3 Sheets-Sheet 3

INVENTOR.
EVERETT S. JOLINE
BY
ATTORNEY

# United States Patent Office 3,277,695
Patented Oct. 11, 1966

3,277,695
VIBRATION ANALYZER
Everett S. Joline, Huntington Station, N.Y., assignor to Sperry Rand Corporation, a corporation of Delaware
Filed June 22, 1961, Ser. No. 118,866
10 Claims. (Cl. 73—71.4)

The present invention generally relates to vibration analyzer equipment and, more particularly, to a vibration analyzer characterized by simplicity of construction and superior performance.

The analysis of vibration is a valuable diagnostic technique for determining the mechanical condition of rotating equipment. The amplitude of vibration of the component parts of rotating equipment is an indicium of many different kinds of mechanical failure and conditions that might cause serious malfunction if allowed to persist. The frequency of vibration can be used to localize the source of the vibration to a particular rotating part inasmuch as each part tends to vibrate at its own characteristic rotational frequency.

The function of the vibration analyzer of the present invention is to provide for the isolation and measurement of the part of the total vibration which is attributable to each component part. The isolation is made on the basis of frequency of vibration through the use of a narrow band pass filter. In view of the fact that the vibration frequency of a given component part varies with changes in system rotational speed, it is necessary that the center frequency of the narrow band pass filter automatically track the characteristic frequency of the given component part under analysis as the rotational speed of the system varies.

There are two basic methods for providing the function of a frequency tracking filter. One method is to adjust the values of the filter parameters such as by hand tuning. However, in the case of high performance filters incorporating many circuit elements, the synchronized joint variation of all of the individual elements presents design problems of substantial magnitude. Additionally, the device that varies the band pass filter parameters must track very accurately all changes in speed of the rotating equipment under analysis.

Another basic technique contemplates the shifting of the frequency spectrum of the vibration signal for application to a narrow band pass filter having fixed-tuned circuit parameters. This method is analogous to the one employed in superheterodyne radio receivers. In this case, the vibration signal is heterodyned with the signal of a variable frequency oscillator thereby creating sum and difference frequency components that can be filtered by a fixed-tuned filter. One disadvantage inherent in the heterodyning technique is that any variation in the center frequency of the fixed-tuned band pass filter (attributable to filter parameter variations) gives rise to relatively large errors particularly where the amplitude of the filtered signal is to be measured with precision. The heterodyning method also suffers from the difficulty in achieving close frequency tracking between the variable frequency oscillator and the rotational speed of the mechanical equipment under analysis.

It is the principal object of the present invention to provide a vibration analyzer characterized by simplicity of construction and precision operation.

Another object is to provide diagnostic equipment of the heterodyning type for monitoring the vibrational characteristics of rotating equipment.

A further object is to provide a vibrational analyzer of the heterodyning type utilizing a fixed-tuned low pass filter for isolating the vibration signal of a predetermined component part.

An additional object is to provide a digitalized vibration analyzer of the heterodyne type.

A further object is to provide a vibration analyzer having a digitalized variable frequency oscillator for reducing the vibrational frequency of a component part under analysis to zero frequency.

A further object is to provide a digitalized vibration analyzer which is relatively insensitive to parameter value variation.

These and other objects of the present invention as will appear from the reading of the following specification are accomplished by the provision of means for shifting the vibration frequency of a predetermined component part of rotating apparatus to zero frequency irrespective of the changes in the rotational speed of said apparatus. The frequency shifted vibration signal is applied to a fixed-tuned low pass filter which rejects signals having frequencies other than zero frequency attributable to vibrating component parts other than said predetermined part. The frequency shifting of the desired vibration signal is accomplished by the use of a pair of modulators which are driven by respective reference signals at the same frequency but in phase quadrature with respect to each other. The vibration signal is jointly applied to both modulators. First and second identical low pass filters are connected respectively to the outputs of the modulators. Provision is made for continuously adjusting the frequency of the reference signals in accordance with changes in the rotational speed of the vibrating component part under analysis.

The direct current signals appearing at the outputs of the respective low pass filters have amplitudes representing vectorial components of the amplitude of the desired vibration signal. The two direct current signals are vectorially combined by means of a root-sum-square circuit to produce a resultant signal having an amplitude proportional to the amplitude of the desired vibrational signal. In a preferred embodiment of the invention, a digitalized variable frequency divider is provided to produce the two reference signals previously noted as being in phase quadrature. The generated reference signals are in the form of stepped waves having a frequency equalling the frequency of the vibrational signal under analysis and having predetermined wave shape designed for the minimization of interfering harmonic components.

For a more complete understanding of the present invention, reference should be had to the following specification and to the appended drawings of which FIG. 1 is a simplified block diagram illustrating the principle of operation of the vibration analyzer of the present invention;

Figure 1:
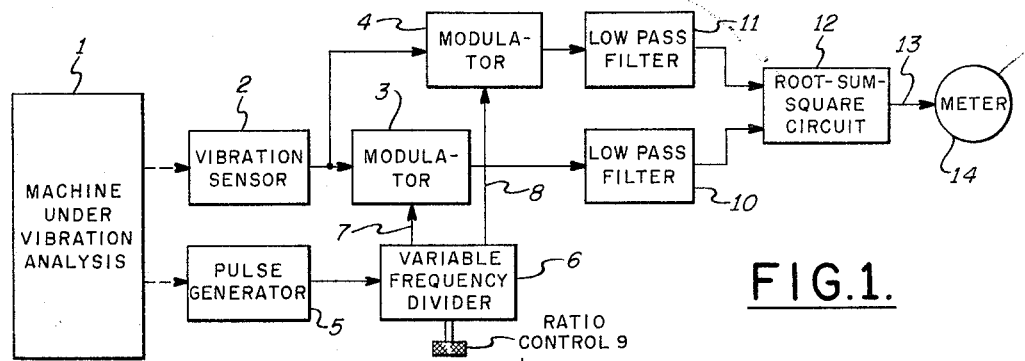

Referring to FIG. 1, the reference numeral 1 generally represents a rotating machine having many interconnected component parts which rotate at respective but related characteristic frequencies. Each of the respective component parts tends to vibrate at frequencies proportional to its own rotational frequency. The vibration signals generated by all of the rotating component parts are applied to a signal transducer such as vibration sensor 2 for the conversion of the several mechanical vibration signals into equivalent electrical signals at corresponding frequencies. The electrical signals at the output of sensor 2 are applied jointly to modulators 3 and 4.

Pulse generator 5 is coupled to a predetermined rotating component part of machine 1. Inasmuch as all of the rotating component parts of machine 1 are mechanically interconnected to rotate at related speeds, the rotational frequencies of the predetermined component part to which generator 5 is coupled is a measure of the rotational speed of all of the rotating component parts. More particularly, the rotational speed of the predetermined part bears a respective unique ratio with respect to the speed of each of the other rotating component parts. The ratios, of course, remain fixed irrespective of changes in the actual rotational speeds of the component parts. Pulse generator 5 produces a train of output pulses having a repetition rate determined by the rotational frequency of the predetermined component part to which it is coupled.

The pulses produced by generator 5 are applied to variable frequency divider 6. Divider 6 produces a pair of signals on output lines 7 and 8 at the same frequency but in phase quadrature with respect to each other. The frequency of the signals appearing on lines 7 and 8 is related to the repetition rate of the pulses produced by generator 5 in accordance with the setting of the ratio control 9. The setting of control 9 is determined by the known unique ratio between the rotational frequency of the predetermined part to which generator 5 is coupled and the rotational frequency of the selected component part whose vibrational characteristic is to be analyzed. The product of the frequency of the signal provided by generator 5 and the ratio factor introduced by control 9 is equal to the vibrational frequency of the component part under analysis irrespective of the rotational speed of the machine 1.

The quadrature signals appearing on lines 7 and 8 are applied respectively to modulators 3 and 4. The signals at the outputs of modulators 3 and 4 are applied respectively to fixed-tuned low pass filters 10 and 11. Filters 10 and 11 pass those signals at the outputs of the modulators 3 and 4 which are at substantially zero frequency (direct current) and reject signals at all other frequencies. In a typical case, filters 10 and 11 may have a cut-off frequency of about a one-half cycle per second and a cut-off characteristic as sharp as desired.

The direct current signals passed by filters 10 and 11 are applied to room-sum-square circuit 12 to produce on line 13 a resultant signal having an amplitude proportional to the amplitude of the desired vibration signal at the inputs of the modulators 3 and 4. The amplitude of the resultant signal appearing on line 13 is indicated by meter 14.

Figure 2:
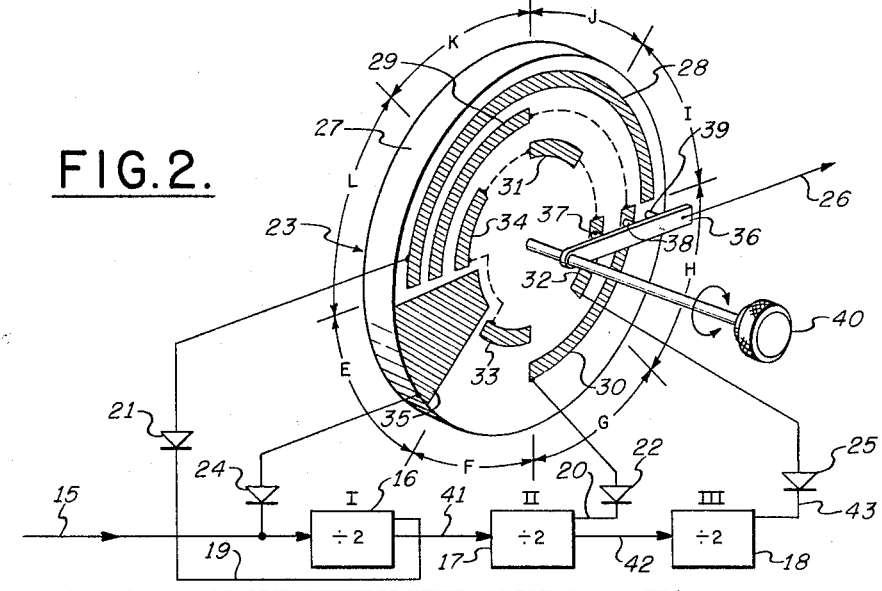
FIG. 2 is a simplified diagram of a digitalized variable frequency divider suitable for use in the system of FIG. 1.

In its preferred form, the present invention contemplates the use of a digitalized instrumentation for variable frequency divider 6. An illustrative embodiment is represented in FIG. 2. The pulses produced at the output of generator 5 of FIG. 1 are applied via line 15 of FIG. 2 to the input of bistable element 16. Bistable element 16 is the first stage of a conventional binary counter chain comprising bistable elements 16, 17 and 18. Only three stages are represented for the sake of simplicity and clarity of exposition. More stages may be employed, if desired.

In the well known manner, bistable element 17 is triggered from one operating state to the other in response to each output pulse produced by element 16. Similarly, element 18 is triggered between its opposite states by the output pulses produced by element 17. Element 16 produces one output pulse for every second input pulse on line 15; element 17 produces one output pulse for every fourth input pulse on line 15 and so on.

In addition to providing the usual interstage triggering pulses, elements 16 and 17 are adapted to produce an additional train of output pulses on lines 19 and 20, respectively. Assuming, for example, that each of the triggering pulses occurs when a bistable element undergoes a 1 to 0 transition in operating condition, then each of the additional pulses are produced during a 0 to 1 transition. It will be recognized by those skilled in the art that the 0 to 1 transition pulses occur midway between and at the same frequency as the 1 to 0 transition pulses.

The additional pulses from elements 16 and 17 are coupled via diodes 21 and 22, respectively, to respective stationary conductive members of switch 23 along with the 0 to 1 transition pulses produced by element 18 and the input pulses appearing on line 15. The purpose of switch 23 is to connect selectable combinations of the pulses coupled by diodes 21, 24, 22 and 25 to a common output line 26. Switch 23, which is similar in structure to conventional shaft position encoders, includes a disc 27 of electrical insulating material. Mounted upon disc 27 is a plurality of annular conductive strips 28, 29, 30, 31, 32, 33 and 34 and wedge-shaped conductive member 35. Said strips are placed on disc 27 in three concentric tracks, segment 28 lying along the outermost track, interconnected segments 31, 32, 33 and 34 forming the innermost track and interconnected segments 29 and 30 lying along an intermediate track.

Rotatable contacting member 36 is provided with three brushes 37, 38 and 39 which are electrically connected together. The angular position of rotatable member 36 may be adjusted by control knob 40. When in the position depicted in FIG. 2, brush 37 is in contact with segment 32, brush 38 is in contact with segment 30 and brush 39 is isolated from segment 28 by the insulating material of disc 27.

Figure 3:
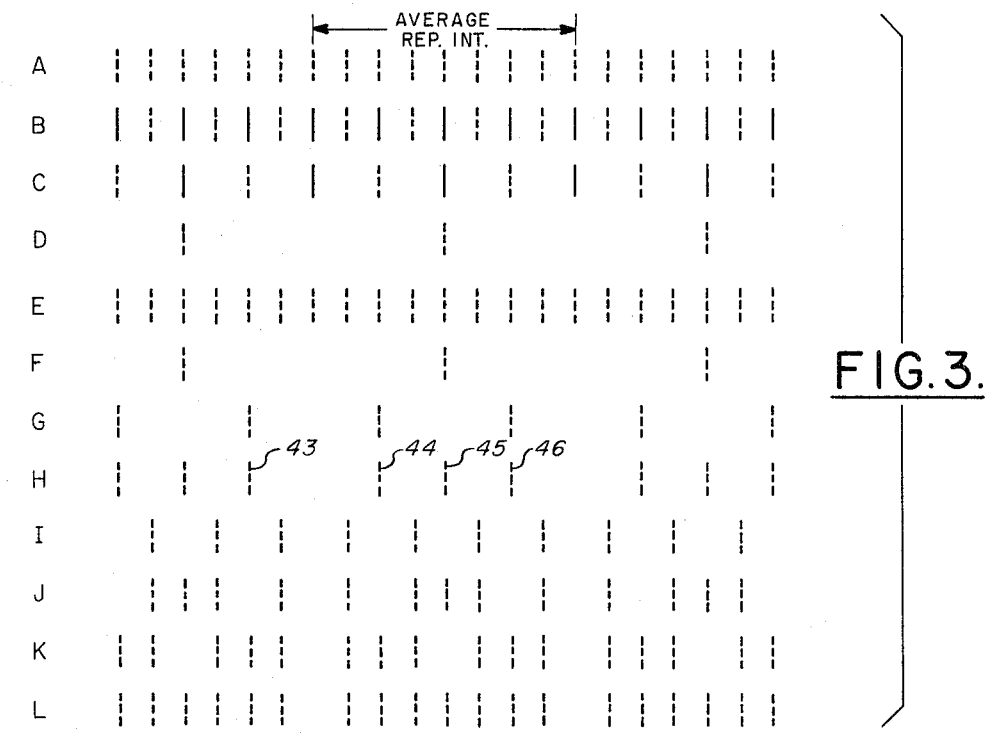
FIG. 3 is a series of idealized pulse-time diagrams useful in explaining the operation of the apparatus represented by FIG. 2.

An understanding of the operation of the binary counter chain and the switch 23 will be facilitated by reference to the pulse time diagram of FIG. 3. Referring to FIGS. 2 and 3, a train of pulses A is applied via line 15 to the input of bistable element 16. As previously discussed, element 16 is the first stage of a conventional binary counter chain, three stages being shown by way of example. Pulses A alternately trigger element 16 into opposite states of conduction, thereby producing on line 41 a train of pulses represented by the solid vertical lines of waveform B to trigger the next successive element 17. Bistable element 16 also produces on output line 19 the train of pulses represented by the dashed vertical lines of waveform B. It will be noted that the pulses of lines 41 and 19 occur at the same repetition rate but out of phase with the pulses of line 19 occurring midway between the successive pulses of line 41.

The pulses of line 41 are produced, for example, when element 16 undergoes 1 to 0 transitions in response to the pulses of line 15, whereas the pulses of line 19 are produced when element 16 undergoes 0 to 1 transitions. Similarly, element 17 produces on line 42 a series of pulses represented by the solid vertical lines of waveform C (during 1 to 0 transitions) and the pulses represented by the dashed vertical lines (during 0 to 1 transitions). Element 18 produces on line 43 only the pulses represented by the dashed vertical lines of waveform D (during 0 to 1 transitions). It should be observed that only one pulse represented by a dashed vertical line is generated by the entire binary chain at any one time.

The pulses appearing on lines 15, 19, 20 and 43 may be applied to line 26 in any desired combination in accordance with the angular position of movable member 36 of switch 23. When member 36 is in the position shown in FIG. 2, the pulses of lines 20 and 43 are combined to produce on output line 26 the pulses represented by waveform H. When member 36 is moved 45 degrees in either direction from the position shown a different pulse pattern occurs on line 26. By inspection, it can be seen that the pulses of waveforms E through L are generated when member 36 is positioned in the respective sectors E through L of switch 23 shown in FIG. 2.

In a given time interval measured by eight successive input pulses on line 15, from 1 to 8 output pulses are produced on line 26 in accordance with the angular setting of member 36 by means of control knob 40. The number of pulses in the given interval are variable in increments of unity. Thus, the average repetition rate of the pulses appearing on line 26 is $n/8$ times the repetition rate of the input pulses of line 15, where $n$ is an integer such that $0 < n < 9$.

It should be noted that the individual pulses comprising trains E, F, G and I recur at uniform repetition intervals, whereas the recurrence interval of the individual pulses comprising waveforms H, J, K and L is somewhat irregular. For example, pulses 43 and 44 of waveform H are separated by four repetition intervals of the pulses of waveform E, while pulses 44, 45 and 46 are separated from each other by only two such repetition intervals. Ideally, each of the pulses of waveform H should be separated by an equal interval to produce a pure fundamental frequency component which is ⅜ the frequency of the fundamental of waveform E.

In general, the deviation of the actual positions of the individual irregularly-spaced pulses from the ideal, evenly-spaced positions varies inversely as the product of the repetition rate of the input pulses applied via line 15 of FIG. 2 and the number of bistable elements comprising the binary counter chain. The higher the frequency of the input pulses and the greater the number of the bistable elements connected in advance of the position of element 17, for example, the closer will the actual positions of the pulses H approach the ideal, evenly-spaced positions. The slight irregularities in the repetition intervals of the individual pulses comprising waveforms H, J, K and L are further reduced by the action of additional binary counterchains comprising part of the demodulators 3 and 4 of FIG. 1.

Figure 4:
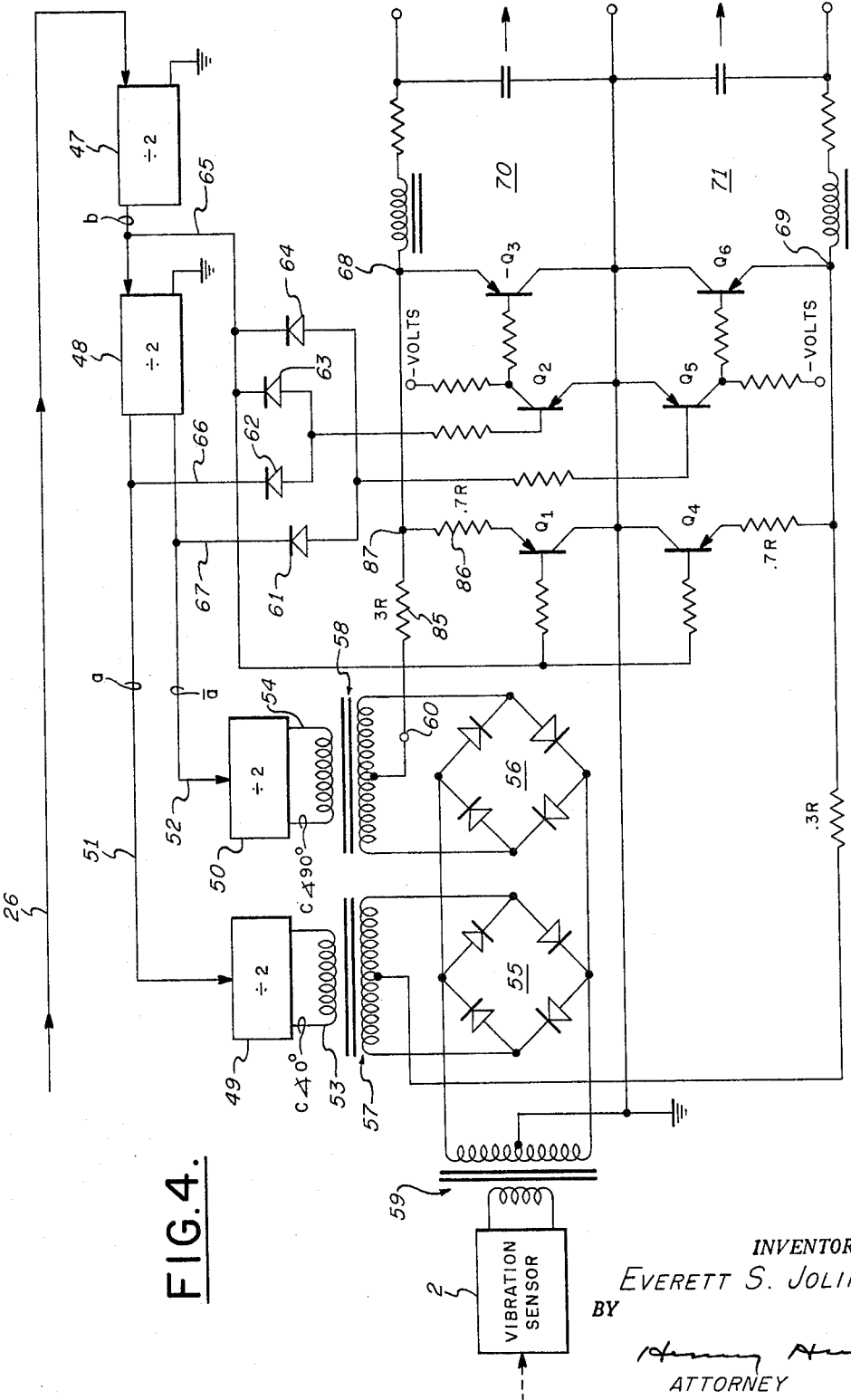
FIG. 4 is a simplified schematic diagram of modulating apparatus preferred for use in the system of FIG. 1.

A preferred embodiment of the modulators 3 and 4 of FIG. 1 is shown in FIG. 4. The output pulses appearing on line 26 in FIG. 2 are applied as trigger pulses to the input of binary element 47 in FIG. 4. Cascaded binary elements 47, 48 and 49 are cascaded binary elements 47, 48 and 50 form first and second binary counterchains. Element 49 is actuated by pulses produced on line 51 each time that element 48 undergoes a 1 to 0 transition. Element 50 is triggered by pulses produced on line 52 each time that element 48 undergoes 0 to 1 transition. There are produced in output transformer windings 53 and 54, respectively, first and second square waves, each having a fundamental frequency ⅛ that of the recurrence rate of the pulses applied via line 26. The square wave applied to winding 53, however, is in phase quadrature with the square wave applied to winding 54. The two square waves are applied as switching control voltages to conventional ring modulators 55 and 56 via transformers 57 and 58, respectively.

The vibration signals detected by vibration sensor 2 are coupled by transformer 59 jointly to modulators 55 and 56. The center tap of the secondary winding of transformer 59 is connected to ground. The two ring modulators 55 and 56 separately modulate the vibration signal in terms of the quadrature switch signals coupled by transformers 57 and 58. Each modulator produces a rectified output wave, having a direct current component representing a respective one of the vectorial components of the amplitude of the vibration signal.

It will be recalled that the modulator of FIG. 4 is provided to shift the frequency of the vibration signal detected by sensor 2 to zero frequency. Such frequency shifting is accomplished ideally by the application of a purely sinusoidal heterodyning signal. In accordance with the present invention, however, the problems associated with the analog circuits required to affect ideal frequency shifting is avoided by the use of the switching type (on-off) modulators 55 and 56. Stepped waves rather than sine waves are employed as the heterodyning signals.

If square wave modulation were employed, some of the odd order harmonics of the vibration signal would appear at the output of the ring modulators. Inasmuch as each harmonic is attenuated by the factor $1/n$ where $n$ is the order of the harmonic, only the third and fifth harmonics are of practical significance. In accordance with the present invention, special provision is made for the elimination of the third and fifth harmonics by the use of two identical signal multiplying circuits comprising coupling diodes 61, 62, 63 and 64 and transistors $Q_1$, $Q_2$, $Q_3$, $Q_4$, $Q_5$ and $Q_6$. One of the identical circuits includes transistors $Q_1$ and $Q_3$ which are connected in the inverted configuration as described, for example, on pages 16–19 through 16–29 of Handbook of Semiconductor Electronics, edited by Lloyd P. Hunter, McGraw-Hill, 1956. The emitter-collector circuits of transistors $Q_1$ and $Q_3$ are connected in shunt with respect to output terminal 60 of modulator 56.

Figure 5:
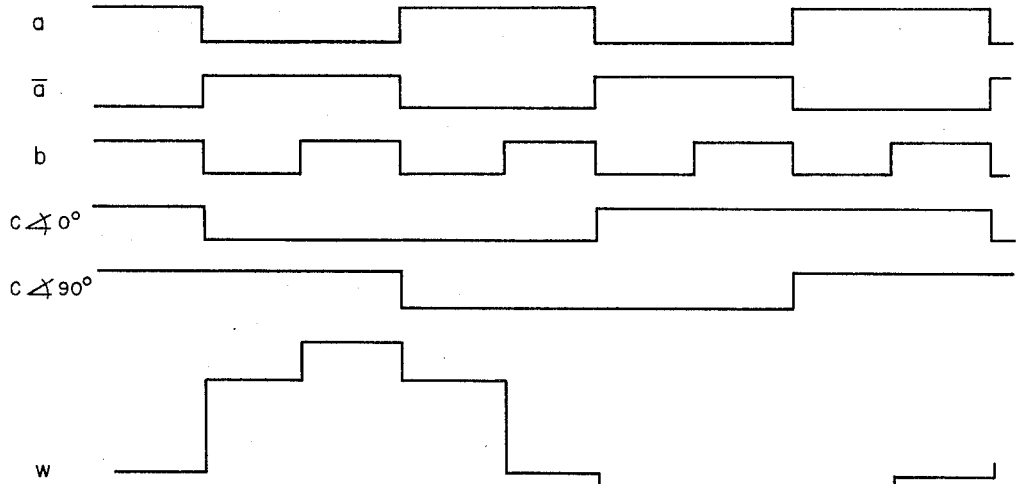
FIG. 5 is a series of idealized wave forms useful in explaining the operation of the apparatus of FIG. 4.

The conduction of transistors $Q_1$ and $Q_3$ is determined in accordance with the binary values of the signals appearing on lines 65, 66 and 67, which, in turn, govern the conduction of the logical network diodes 61, 62, 63 and 64. Waveforms $a$, $\bar{a}$ and $b$ of FIG. 5 represent signals appearing on lines 66, 67 and 65, respectively. Transistor $Q_1$ is turned on (rendered conductive) during the negative-going excursions of waveform $b$. Upon the conduction of transistor $Q_1$, a voltage divider comprising resistors 85 and 86 is connected between terminal 60 and ground to cause the voltage at terminal 87 to be reduced to .707 of the value of the voltage at terminal 60 with respect to ground. Diodes 62 and 63 are rendered nonconductive only when the positive-going excursion of waveform $a$ coincides with the positive-going excursion of waveform $b$. Upon the nonconduction of both diodes 62 and 63, transistor $Q_2$ is turned off, thus turning on inverted transistor $Q_3$. Upon the conduction of transistor $Q_3$, the output signal of modulator 56 is short circuited to ground.

In effect, the vibration signal from source 2 is first multiplied in a ring modulator by a square wave function. Then, the resulting product is further multiplied by a stepped function, the stepped function being 0 when $Q_3$ conducts, .707 of unity when $Q_1$ conducts, and unity when neither of $Q_1$ or $Q_3$ conducts. The net result is the same as though the vibration signal were directly multiplied by the stepped square wave function of waveform W of FIG. 5. Thus, the vibration signal is reduced to 0 frequency with the aid of the shaped signal function W which approximates an ideal sinusoidal modulating signal to the extent that the third and fifth harmonics are absent from the shaped signal. Substantially only the fundamental frequency component of the vibration signal is reduced to 0 frequency (direct current) and made available across terminal 68 and ground.

The amplitude of the direct current signal appearing across terminal 68 and ground represents the value of a vectorial component of the amplitude of the vibration signal. In a similar manner, the other vectorial component of the vibration signal is represented by the direct current signal developed across terminal 69 and ground by the action of modulator 55 and the logical switching network including transistors $Q_4$, $Q_5$ and $Q_6$. The direct current signals are passed by respective ones of LRC low pass filters 70 and 71.

Figure 6:
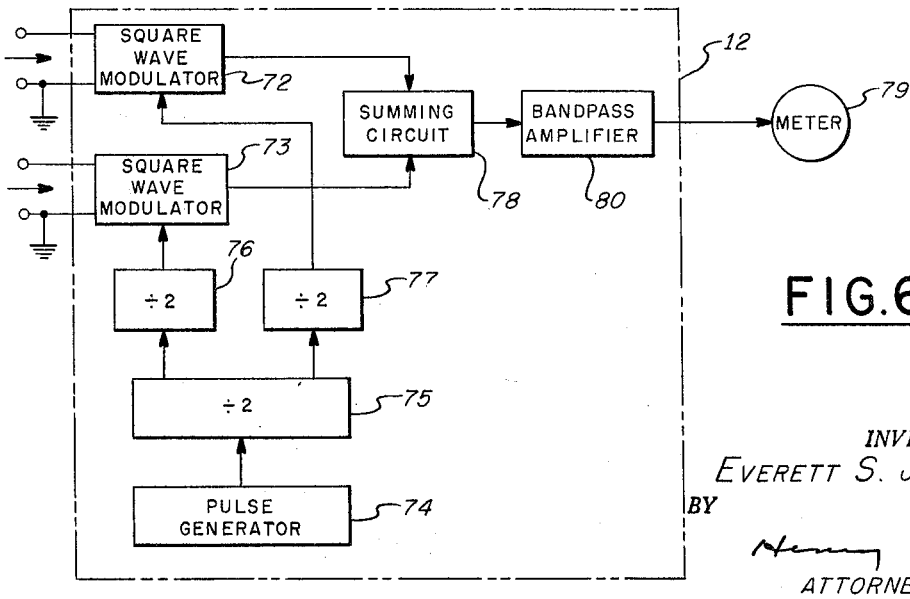
FIG. 6 is a simplified block diagram of a root-sum-square circuit suitable for use in the system of FIG. 1.

The direct current signals passed by filters 70 and 71 are applied respectively to first inputs of square wave modulators 72 and 73 of FIG. 6. Modulators 72 and 73, like modulators 55 and 56, are driven in phase quadrature. A pair of modulating signals in phase quadrature with respect to each other is developed by pulse generator 74 and bistable elements 75, 76 and 77.

Two square waves at the same frequency but in phase quadrature are produced by modulators 72 and 73 and applied to linear summing circuit 78. The summed signals are applied to meter 79 by means of narrow band pass amplifier 80. Amplifier 80 is designed to extract the fundamental frequency component of the linearly combined signals at the output of circuit 78. Meter 79 responds to the amplitude of the extracted component, which amplitude represents the amplitude of the vibration signal which has been isolated for analysis.

It can be seen from the preceding specification that the objects of the present invention have been achieved in a preferred embodiment of a digitalized vibration analyzer of the heterodyne type. A feature of the invention is that a vibration signal of a preselected component part under analysis is reduced to 0 frequency, whereupon said vibration signal may be isolated by means of a low pass filter from the vibration signals generated by all other component parts. The use of a low pass filter eliminates the possibility of center frequency shift of the filter, said filter center frequency being zero. A change in the value of filter parameters effects merely a change in the magnitude of the pass band of the filter, the pass band changing symmetrically about 0 frequency.

The zero frequency technique facilitates the use of a digitalized frequency changer for producing a heterodyning signal which continuously tracks the frequency of the vibration signal irrespective of the rotational speed of the machine under vibration analysis. The digital method of frequency changing eliminates calibration requirements and errors attributable to analog devices and introduces the precision and reliability associated with digital techniques.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A vibration analyzer for monitoring the vibration characteristics of rotating equipment having a multiplicity of interconnected component parts, the component parts having rotational frequencies bearing respective unique ratios relative to the rotational frequency of a predetermined one of said component parts irrespective of the speed of rotation of said equipment, said analyzer comprising means coupled to said equipment for converting the vibrations of said equipment into first electrical signals having frequencies corresponding to the frequencies of said vibrations, means including a variable frequency shifter coupled to said predetermined one of said component parts for producing second electrical signals having a frequency bearing a selectable one of said unique ratios to the frequency of vibration of said predetermined one of said component parts, modulating means coupled to receive said first and said second electrical signals, signal utilization means, and a low pass filter for connecting the output of said modulating means to the input of said utilization means.

2. A vibration analyzer for monitoring the vibration characteristics of rotating equipment having a multiplicity of interconnected component parts, the component parts having rotational frequencies bearing respective unique ratios relative to the rotational frequency of a predetermined one of said component parts irrespective of the speed of rotation of said equipment, said analyzer comprising a vibration sensor coupled to said equipment for converting the vibrations of said equipment into first electrical signals having frequencies corresponding to the frequencies of said vibrations, means including a digitalized variable frequency shifter coupled to said predetermined one of said component parts for producing second electrical signals having a frequency bearing a selectable one of said unique ratios to the frequency of vibration of said predetermined one of said component parts, modulating means coupled to receive said first and second electrical signals, signal utilization means, and a low pass filter for connecting the output of said modulating means to the input of said utilization means.

3. A vibration analyzer for monitoring the vibration characteristics of rotating equipment having a multiplicity of interconnected component parts, the component parts having rotational frequencies bearing respective unique ratios relative to the rotational frequency of a predetermined one of said component parts irrespective of the speed of rotation of said equipment, said analyzer comprising means coupled to said equipment for converting the vibrations of said equipment into first electrical signals having frequencies corresponding to the frequencies of said vibrations, means including a variable frequency shifter coupled to said predetermined one of said component parts for producing second electrical signals having a frequency bearing a selectable one of said unique ratios to the frequency of vibration of said predetermined one of said component parts, modulating means coupled to receive said first and said second electrical signals, low pass filtering means directly coupled to the output of said modulating means, a signal amplitude indicator, and means for connecting the output of said filtering means to the input of said indicator.

4. A vibration analyzer for monitoring the vibration characteristics of rotating equipment having a multiplicity of interconnected component parts, the component parts having rotational frequencies bearing respective unique ratios relative to the rotational frequency of a predetermined one of said component parts irrespective of the speed of rotation of said equipment, said analyzer comprising a vibration sensor coupled to said equipment for converting the vibrations of said equipment into first electrical signals having frequencies corresponding to the frequencies of said vibrations, means including a digitalized variable frequency shifter coupled to said predetermined one of said component parts for producing second electrical signals having a frequency bearing a selectable one of said unique ratios to the frequency of vibration of said predetermined one of said component parts, modulating means coupled to receive said first and second electrical signals, low pass filtering means directly coupled to the output of said modulating means, a signal amplitude indicator, and means for connecting the output of said filtering means to the input of said indicator.

5. A vibration analyzer for monitoring the vibration characteristics of rotating equipment having a multiplicity of interconnected component parts, the component parts having rotational frequencies bearing respective unique ratios relative to the rotational frequency of a predetermined one of said component parts irrespective of the speed of rotation of said equipment, said analyzer comprising means coupled to said equipment for converting the vibrations of said equipment into first electrical signals having frequencies corresponding to the frequencies of said vibrations, a pulse generator coupled to said predetermined one of said component parts for producing a pulse train having a repetition rate determined by the frequency of vibration of said predetermined one of said component parts, a digitalized variable frequency divider coupled to receive said pulse train for producing second electrical signals having a frequency bearing a selectable ratio to said repetition rate of said pulse train, modulating means to receive said first and second electrical signals, low pass filtering means directly coupled to the output of said modulating means, a signal amplitude indicator, and means for interconnecting the output of said filtering means and the input of said indicator.

6. A vibration analyzer for monitoring the vibration characteristics of rotating equipment having a multiplicity of interconnected component parts, the component parts having rotational frequencies bearing respective unique ratios relative to the rotational frequency of a predetermined one of said component parts irrespective of the speed of rotation of said equipment, said analyzer comprising means coupled to said equipment for converting the vibrations of said equipment into first electrical signals having frequencies corresponding to the frequency of said vibrations, means including a variable frequency shifter coupled to said predetermined one of said component parts for producing second and third electrical signals each having the same frequency which bears a selectable one of said unique ratios to the frequency of vibration of said predetermined one of said component parts, said second and third signals being in phase quadrature with respect to each other, first and second modulating means, said first signals being coupled to first inputs of both said modulating means and said second and third signals being coupled to second inputs of respective ones of said modulating means, first and second low pass filters coupled to the outputs of respective ones of said modulating means, a root-sum-square circuit coupled to the outputs of said low pass filters, and signal utilization means coupled to the output of said circuit.

7. A vibration analyzer for monitoring the vibration characteristics of rotating equipment having a multiplicity of interconnected component parts, the component parts having rotational frequencies bearing respective unique ratios relative to the rotational frequency of a predetermined one of said component parts irrespective of the speed of rotation of said equipment, said analyzer comprising means coupled to said equipment for converting the vibrations of said equipment into first electrical signals having frequencies corresponding to the frequencies of said vibrations, means including a digitalized variable frequency shifter coupled to said predetermined one of said component parts for producing second and third electrical signals each having the same frequency which bears a selectable one of said unique ratios to the frequency of vibration of said predetermined one of said component parts, said second and thirds signals being in phase quadrature with respect to each other, first and second modulating means each having two inputs, said first electrical signals being applied jointly to one of the inputs of both said modulating means, said second signal being coupled to the other input terminal of said first modulating means and said third signal being coupled to the other input terminal of said second modulating means, first and second low pass filters connected to the outputs of said first and second modulating means, respectively, a signal amplitude indicator, and a root-sum-square circuit for connecting the outputs of both said filters to the input of said indicator.

8. A vibration analyzer for monitoring the vibration characteristics of rotating equipment having a multiplicity of interconnected component parts, the component parts having rotational frequencies bearing respective unique ratios relative to the rotational frequency of a predetermined one of said component parts irrespective of the speed of rotation of said equipment, said analyzer comprising means coupled to said equipment for converting the vibrations of said equipment into first electrical signals having frequencies corresponding to the frequencies of said vibrations, means including a variable frequency shifter coupled to said predetermined one of said component parts for producing second and third electrical signals each having the same frequency which bears a selectable one of said unique ratios to the frequency of vibration of said predetermined one of said component parts, said second and third signals being in phase quadrature with respect to each other, first and second modulating means, said first signals being coupled to first inputs of both said modulating means and said second and third signals being coupled to second inputs of respective ones of said modulating means, first and second signal multiplying means connected to the outputs of said first and second modulating means, respectively, and operative synchronously with said second and third signals for shaping the output signals produced by said first and second modulating means, respectively, first and second low pass filters coupled to the outputs of respective ones of said multiplying means, a root-sum-square circuit coupled to the outputs of said low pass filters, and signal utilization means coupled to the output of said circuit.

9. A vibration analyzer for monitoring the vibration characteristics of rotating equipment having a multiplicity of interconnected component parts, the component parts having rotational frequencies bearing respective unique ratios relative to the rotational frequency of a predetermined one of said component parts irrespective of the speed of rotation of said equipment, said analyzer comprising means coupled to said equipment for converting the vibrations of said equipment into first electrical signals having frequencies corresponding to the frequencies of said vibrations, a pulse generator coupled to said predetermined one of said component parts for producing a pulse train having a repetition rate determined by the frequency of vibration of said predetermined one of said component parts, a digitalized variable frequency divider coupled to receive said pulse train for producing second and third electrical signals each having the same frequency which bears a selectable ratio to said repetition rate of said pulse train, said second and third signals being in phase quadrature with respect to each other, first and second modulating means, said first signals being coupled to first inputs of both said modulating means and said second and third signals being coupled to second inputs of respective ones of said modulating means, first and second signal multiplying means connected to the outputs of said first and second modulating means, respectively, and operative synchronously with said second and third signals for shaping the output signals produced by said first and second modulating means, respectively, first and second low pass filters coupled to the outputs of respective ones of said multiplying means, a root-sum-square circuit coupled to the outputs of said low pass filters, and signal utilization means coupled to the output of said circuit.

10. A vibration analyzer for monitoring the vibration characteristics of rotating equipment having a multiplicity of interconnected component parts, the component parts having rotational frequencies bearing respective unique ratios relative to the rotational frequency of a predetermined one of said component parts irrespective of the speed of rotation of said equipment, said analyzer comprising a vibration sensor coupled to said equipment for converting the vibrations of said equipment into first electrical signals having frequencies corresponding to the frequencies of said vibrations, a pulse generator coupled to said predetermined one of said component parts for producing a pulse train having a repetition rate determined by the frequency of vibration of said predetermined one of said component parts, a digitalized variable frequency divider coupled to receive said pulse train for producing second and third electrical signals each having the same frequency which bears a selectable ratio to said repetition rate of said pulse train, said second and third signals being in phase quadrature with respect to each other, first and second modulating means, said first signals being coupled to first inputs of both said modulating means and said second and third signals being coupled to second inputs of respective ones of said modulating means, first and second signal multiplying means connected to the outputs of said first and second modulating means, respectively, and operative synchronously with said second and third signals for shaping the output signals produced by said first and second modulating means, respectively, first and second low pass filters coupled to the outputs of respective ones of said multiplying means, a root-sum-square circuit coupled to the outputs of said low pass filters, and signal amplitude indicator means coupled to the output of said circuit.

References Cited by the Examiner

UNITED STATES PATENTS

| | | | |
|---|---|---|---|
| 2,377,349 | 6/1945 | MacKenzie | 73—71.4 X |
| 2,729,972 | 1/1956 | Schwidetsky | 73—67.2 |
| 2,787,907 | 4/1957 | King | 73—462 |
| 2,915,897 | 12/1959 | Hoffmann | 73—71.4 |

OTHER REFERENCES

Fundamentals of Digital Computers; book by Matthew Mandl; published by Prentice-Hall, Inc., 1958. Pages 152–157 relied upon.

Applied Electronics; Truman S. Gray; John Wiley and Sons, Inc., New York; second edition, 1954; pages 277 and 689 of interest.

RICHARD C. QUEISSER, *Primary Examiner.*

ROBERT EVANS, *Examiner.*

R. A. MEWHINNEY, L. R. FRANKLIN,
*Assistant Examiners.*